(12) United States Patent
Wang

(10) Patent No.: US 11,225,988 B2
(45) Date of Patent: Jan. 18, 2022

(54) OPERATING LEVER ASSEMBLY

(71) Applicant: FIVETECH TECHNOLOGY INC., New Taipei (TW)

(72) Inventor: Ting-Jui Wang, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 853 days.

(21) Appl. No.: 15/977,038

(22) Filed: May 11, 2018

(65) Prior Publication Data
US 2019/0242415 A1 Aug. 8, 2019

(30) Foreign Application Priority Data
Feb. 8, 2018 (TW) .................................. 107104571

(51) Int. Cl.
*F16B 5/00* (2006.01)
*G05G 1/04* (2006.01)

(52) U.S. Cl.
CPC ............. *F16B 5/0084* (2013.01); *G05G 1/04* (2013.01)

(58) Field of Classification Search
CPC .................................................... F16B 5/0084
See application file for complete search history.

(56) References Cited

U.S. PATENT DOCUMENTS

| 7,749,006 B2 * | 7/2010 | Chiang | H05K 7/1409 439/160 |
| 10,070,549 B2 * | 9/2018 | Su | H05K 7/1409 |
| 10,686,268 B2 * | 6/2020 | Wang | H05K 7/1411 |
| 2004/0192095 A1 * | 9/2004 | Joist | H05K 7/1414 439/188 |

FOREIGN PATENT DOCUMENTS

CN 201843864 U 5/2011

* cited by examiner

*Primary Examiner* — Vicky A Johnson
(74) *Attorney, Agent, or Firm* — Schmeiser, Olsen & Watts, LLP

(57) ABSTRACT

An operating lever assembly includes a fastening member having a retaining section releasably fastened to a first object, a receiving space and a locating section; and a lever member having a mating locating section and being movably connected at an end to the receiving space and at another end to a second object. Alternatively, the fastening member includes a retaining section and a locating section; and the lever member includes a mating locating section and a receiving space, to which the fastening member is movably connected. The fastening member can be pushed to release the retaining section from the first object, while the lever member is moved in the receiving space and the locating section is engaged with the mating locating section to hold the fastening member to the lever member, allowing the first object to be repeatedly and quickly separated from or fastened to the second object.

18 Claims, 10 Drawing Sheets

OPERATING LEVER ASSEMBLY

CROSS-REFERENCE TO RELATED APPLICATION

This non-provisional application claims priority under 35 U.S.C. § 119(a) on Patent Application No(s). 107104571 filed in Taiwan, R.O.C. on Feb. 8, 2018, the entire contents of which are hereby incorporated by reference.

FIELD OF THE INVENTION

The present invention relates to an operating lever assembly, and more particularly to an operating lever assembly, with which two objects connected thereto can be repeatedly quickly fastened to or separated from each other.

BACKGROUND OF THE INVENTION

Generally, screws are used to lock two objects together. In this manner, the two objects can be fixed in place without being easily separated from each other, so that a stable and firm connection of the two objects to each other can be ensured.

However, once the two objects are firmly held together using screws without being easily separable from each other, it might be uneasy to further assemble the two combined objects to another object. Also, the two objects connected together using screws could not be conveniently detached from each other when necessary.

It is therefore desirable to develop an operating lever assembly that allows repeated and quick fastening and releasing of two objects to and from each other.

SUMMARY OF THE INVENTION

To overcome the disadvantages of the conventional fastening manner, a primary object of the present invention is to provide an operating lever assembly, with which two objects connected thereto can be repeatedly quickly fastened to or separated from each other.

To achieve the above and other objects, the operating lever assembly according to an embodiment of the present invention includes a fastening member and a lever member. The fastening member includes a retaining section, a receiving space and at least one locating section, and the lever member includes at least one mating locating section and is movably connected to the receiving space of the fastening member. Or, according to an alternative embodiment of the present invention, the fastening member of the operating lever assembly includes a retaining section and at least one locating section, and the lever member includes at least one mating locating section and a receiving space, to which the fastening member is movably connected.

To achieve the above and other objects, the operating lever assembly according to another embodiment of the present invention includes a fastening member and a lever member. The fastening member includes a retaining section, a receiving space and at least one locating section; and the lever member includes at least one mating locating section for correspondingly engaging with the at least one locating section and is movably connected to the receiving space of the fastening member. Or, according to an alternatively embodiment, the fastening member includes a retaining section and at least one locating section; and the lever member includes at least one receiving space, to which the fastening member is movably connected, and at least one mating locating section for correspondingly engaging with the at least one mating locating section.

In the operating lever assembly of the present invention, the fastening member or the lever member includes a connecting section for connecting the fastening member and the lever member to each other.

In the operating lever assembly of the present invention, the fastening member includes an operating section.

In the operating lever assembly of the present invention, the fastening member or the lever member includes a flexible space located corresponding to the at least one locating section or the at least one mating locating section, respectively. The flexible space is elastically deformable or reducible when the locating section is moving between two mating locating sections or the mating locating section is moving between two locating sections.

In the operating lever assembly of the present invention, the flexible space can be any one of a through hole, a through slot, a holed section, a slotted section, a recess, a stepped section, a cut, a groove, a sunken hole, a cavity, a protrusion, a flat section, a cambered section, a curved section and a corrugated section.

In the operating lever assembly of the present invention, a connecting section is provided on one of or between the fastening member and the lever member; and the fastening member and the lever member are movably connected to each other via the connecting section.

In the operating lever assembly of the present invention, a movement space is provided on one of the fastening member and the lever member and located corresponding to the connecting section; and the connecting section is movable within the movement space.

In the operating lever assembly of the present invention, the connecting section can be a pin or a fastening element.

In the operating lever assembly of the present invention, the retaining section of the fastening member is fastened to a mating retaining section of an object.

In the operating lever assembly of the present invention, the receiving space allows the lever member or the fastening member to move therein when any one of them are moving relative to the other one.

In the operating lever assembly of the present invention, the locating section is an elastic retaining element and can be caused to elastically move out of, move into or interfere with the mating locating section of the lever member when the fastening member is operated, turned or moved.

In the operating lever assembly of the present invention, the locating section can be an interfering element or a retaining element, which can be caused to move out of or move into or interfere with the mating locating section of the lever member when the fastening member is operated, turned or moved.

In the operating lever assembly of the present invention, the locating section or the mating locating section can be any one of a protrusion, a recess, a stepped section, a cambered section, a curved section, a flat section and an elastic retaining element.

In the operating lever assembly of the present invention, the lever member includes an assembling section for assembling to another object.

In the operating lever assembly of the present invention, the lever member includes a push section for pressing against a corresponding push member.

In the operating lever assembly of the present invention, the lever member can include one, two or more push sections for pressing against the corresponding push member, so that an object assembled to the lever member can be more easily pushed, stopped, opened, closed or turned through leverage using the one or more push sections.

In the operating lever assembly of the present invention, the retaining section can be any one of a hook, a post, a protrusion, a recess, a stepped section, a cambered section, a curved section, a flat section and a beveled section.

In the operating lever assembly of the present invention, the fastening member includes an operating section, which can be any one of a post, a hook, a protrusion, a recess, a stepped section, a cambered section, a curved section, a flat section and a beveled section.

In the operating lever assembly of the present invention, the fastening member or the lever member is formed by in-mold injection molding using a mold and a heated molten raw material, which is poured into the mold and is then cooled and molded to form a solid fastening member.

In the operating lever assembly of the present invention, the fastening member or the lever member includes one or more locating sections or mating locating sections, respectively, to provide the function of holding the fastening member in place on the lever member when the fastening member is released from the object fastened thereto or is re-fastened to the object to be fastened thereto.

In the operating lever assembly of the present invention, the fastening member or the lever member includes one or more locating sections or mating locating sections, respectively, to provide the function of releasing the fastening member from the lever member after the fastening member has been held in place on the lever member when the fastening member is released from an object fastened thereto.

In the operating lever assembly of the present invention, the fastening member or the lever member is movable within the receiving space in a rotational motion or in a linear motion.

In the operating lever assembly of the present invention, the mating locating section is an elastic retaining element and can be caused to elastically move out of, move into or interfere with the locating section of the fastening member when the fastening member is operated, turned or moved.

In the operating lever assembly of the present invention, the receiving space can be any one of a through hole, a through slot, a holed section, a slotted section, a recess, a sunken hole, a cavity, a stepped section, a cut, a protrusion, a flat section, a cambered section, a curved section, a groove and a corrugated section.

In the operating lever assembly of the present invention, when the fastening member and the lever member are moving relative to each other, the locating section of the fastening member and the mating locating section of the lever member can temporarily or non-temporarily hold each other in place or interfere with each other to thereby stop the fastening member and the lever member from moving further.

In the operating lever assembly of the present invention, the locating section of the fastening member is in the form of an elastic retaining element and can therefore be elastically extended into and held to the receiving space of the lever member.

In the operating lever assembly of the present invention, the mating locating section of the lever member is in the form of an elastic retaining element and can therefore be elastically extended into and held to the receiving space of the fastening member.

In the operating lever assembly of the present invention, the assembling section is assembled to a lifting and pulling section for lifting and pulling a corresponding object to be lifted.

In the operating lever assembly of the present invention, the lifting and pulling section includes coupling sections for coupling with mating coupling sections of an object In the operating lever assembly of the present invention, the assembling section is rotatably connected to an interconnecting element, which is in turn connected to a corresponding object.

With the above arrangements, the lever member of the operating lever assembly of the present invention can be movably assembled to a second object and the retaining section of the fastening member of the operating lever assembly can be releasably fastened to a first object. The fastening member can be pushed, such that the retaining section is released from the first object, the lever member is moved in the receiving space, and the locating section is engaged with the mating locating section to hold the fastening and the lever member to each other while the first object is quickly separated from the second object.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
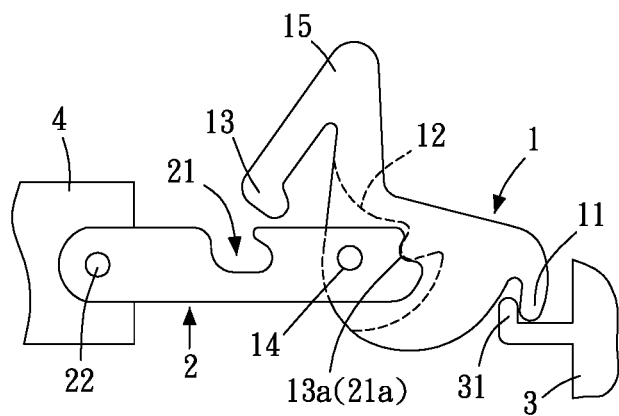
FIG. 1 shows an operating lever assembly according to a first preferred embodiment of the present invention in use.

The present invention will now be described with some preferred embodiments thereof and by referring to the accompanying drawings. For the purpose of easy to understand, elements that are the same in the preferred embodiments are denoted by the same reference numerals.

Figure 2:
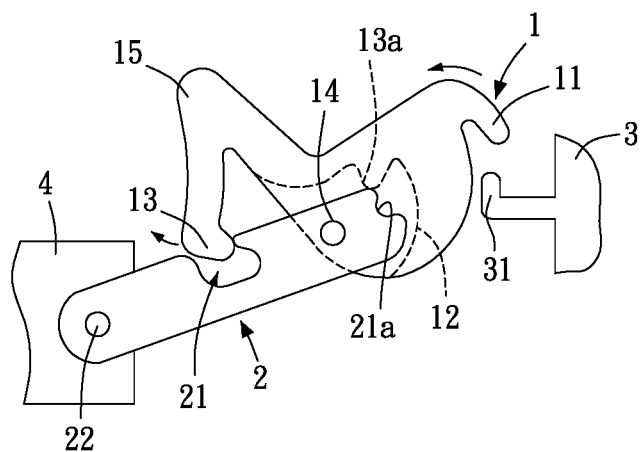
FIG. 2 shows an operating lever assembly according to a first preferred embodiment of the present invention in use.
Figure 3:
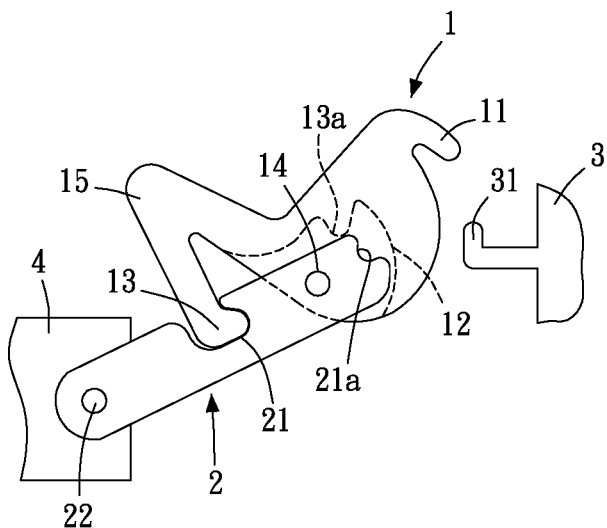
FIG. 3 shows an operating lever assembly according to a first preferred embodiment of the present invention in use.

Please refer to FIGS. 1 to 3, in which an operating lever assembly according to a first preferred embodiment of the present invention is shown. As shown, the operating lever assembly in the first preferred embodiment includes a fastening member 1 and a lever member 2.

The fastening member 1 includes a retaining section 11, a receiving space 12 and at least one first locating section 13. The receiving space 12 can be a through hole, a through slot, a holed section, a slotted section, a recess, a sunken hole, a cavity, a stepped section, a cut, a protrusion, a flat section, a cambered section, a curved section, a groove or a corrugated body.

The lever member 2 includes at least one first mating locating section 21 and an assembling section 22. The lever member 2 is movably connected to the receiving space 12 of the fastening member 1.

When the operating lever assembly according to the first preferred embodiment of the present invention is in use, the retaining section 11 of the fastening member 1 is releasably fastened to a mating retaining section 31 on a first object 3, and the assembling section 22 of the lever member 2 is movably assembled to a second object 4, such that the first object 3 and the second object 4 are fastened to each other via the fastening member 1 and the lever member 2. To release the first object 3 from the second object 4, simply apply a force on the fastening member 1 for the fastening member 1 and the lever member 2 to pivotally turn relative to each other within the receiving space 12, so that the first locating section 13 is moved into the first mating locating section 21 to thereby bring the fastening member 1 and the lever member 2 to displace at the same time, which further enables release of the first object 3 from the second object 4. With these arrangements, the operating lever assembly of the present invention allows repeated and quick fastening and releasing of the first object 3 to and from the second object 4.

In the first preferred embodiment of the present invention, a connecting section 14 is provided on the fastening member 1 and located between the fastening member 1 and the lever member 2, so that the fastening member 1 and the lever member 2 are movably connected to each other via the connecting section 14. The connecting section 14 can be a pin or a fastening element that not only allows movable connection of the fastening member 1 and the lever member 2 to each other, but also prevents separation of the fastening member 1 and the lever member 2 from each other while moving relative to each other.

In the first preferred embodiment of the present invention, the fastening member 1 also includes an operating section 15, to where a force can be applied to achieve the purpose of fastening and releasing two objects via the operating lever assembly. The operating section 15 can be a post, a hook, a protrusion, a recess, a stepped section, a cambered section, a curved section, a flat section or a beveled section, so that the force can be applied in different manners according to actual need in using the operating lever assembly.

In the first preferred embodiment of the present invention, the retaining section 11 of the fastening member 1 can be a hook, a post, a protrusion, a recess, a stepped section, a cambered section, a curved section, a flat section or a beveled section, so as to be correspondingly fastened to different types of objects according to actual need in using the operating lever assembly.

In the first preferred embodiment of the present invention, the first locating section 13 is an elastic retaining element. When the fastening member 1 is operated, turned or moved, the first locating section 13 is caused to elastically move out of, move into or interfere with the first mating locating section 21 of the lever member 2. Due to its elasticity, the first locating section 13 can be more easily moved out of, moved into or interfered with the first mating locating section 21 of the lever member 2. Similarly, the first mating locating section 21 can also be an elastic retaining element, so that it can be elastically moved out of, moved into or interfered with the first locating section 13 when the fastening member 1 is operated, turned or moved.

In the first preferred embodiment of the present invention, the first locating section 13 can be an interfering element or a retaining element, which is moved out of or moved into the first mating locating section 21 of the lever member 2 when the fastening member 1 is operated, turned or moved, so as to locate the fastening member 1 in place on the lever member 2. The first locating section 13 and the first mating locating section 21 can respectively be a protrusion, a recess, a stepped section, a cambered section, a curved section, a flat section or an elastic retaining element, depending on different locating requirements. It is noted that, when the fastening member 1 and the lever member 2 are moving relative to each other, the first locating section 13 of the fastening member 1 and the first mating locating section 21 of the lever member 2 can temporarily or non-temporarily hold each other in place or interfere with each other to thereby stop the fastening member and the lever member from moving further.

In the first preferred embodiment of the present invention, the fastening member 1 further includes a second locating section 13a, which is located in the receiving space 12; and the lever member 2 includes a second mating locating section 21a for movably and releasably engaging with the second locating section 13a. When the retaining section 11 of the fastening member 1 is fastened to the mating retaining section 31 of the first object 3, the second locating section 13a is engaged with the second mating locating section 21a to thereby stop the fastening member 1 from moving. When the fastening member 1 is released from the first object 3, the second locating section 13a is disengaged from the second mating locating section 21a, allowing the first locating section 13 to move into the first mating locating section 21 and thereby locate the fastening member 1 in place on the lever member 2. Therefore, with the first locating/mating locating section 13, 21, the fastening member 1 can always be firmly held to the lever member 2 when the first object 3 is released from the second object 4; and, with the second locating/mating locating section 13a, 21a, the fastening member 1 can always be firmly held to the lever member 2 when the first object 3 is fastened to the second object 4.

Further, for the present invention to be more practical for use, the fastening member 1 or the lever member 2 can include more than one first locating section 13 or first mating locating section 21, respectively, to provide the function of holding the fastening member 1 in place on the lever member 2 when the fastening member 1 is released from the first object 3, or holding the fastening member 1 in place on the lever member 2 when the fastening member 1 is re-fastened to the first object 3, or releasing the fastening member 1 from the lever member 2 after the fastening member 1 has been held in place on the lever member 2 when the fastening member 1 is released from the first object 3.

Figure 4:
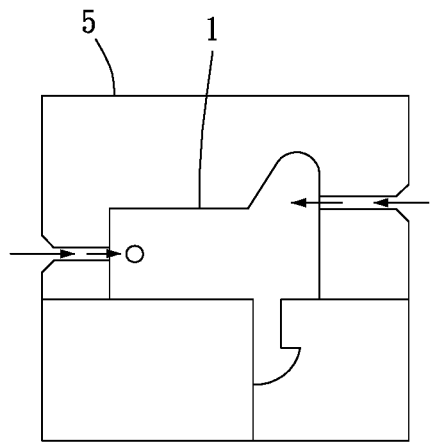
FIG. 4 illustratively shows the forming of a fastening member included in the operating lever assembly according to the present invention.

FIG. 4 illustratively shows the forming of the fastening member 1 or the lever member 2 in the operating lever assembly according to the first preferred embodiment of the present invention. As shown, the fastening member 1 is formed by in-mold injection molding using a mold 5. First, a heated molten raw material is poured into the mold 5. Then, the raw material is cooled and molded to form a solid fastening member 1. Depending on actual need, the lever member 2 can also be formed in the same manner (not shown) as the fastening member 1.

Figure 5:
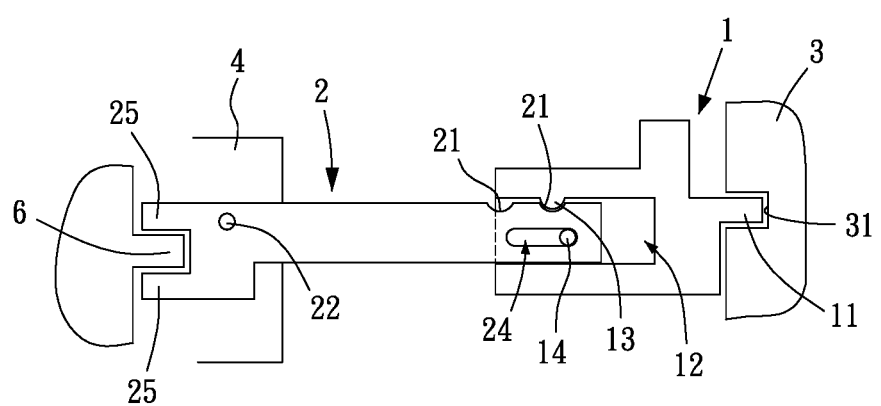
FIG. 5 shows an operating lever assembly according to a second preferred embodiment of the present invention in use.
Figure 6:
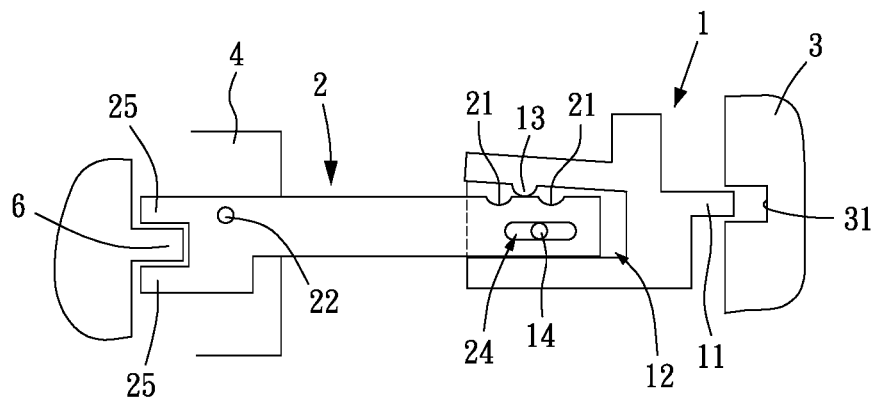
FIG. 6 shows an operating lever assembly according to a second preferred embodiment of the present invention in use.
Figure 7:
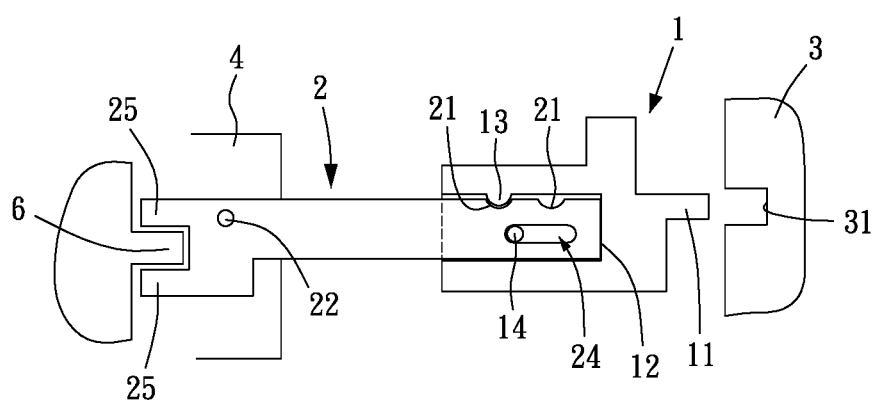
FIG. 7 shows an operating lever assembly according to a second preferred embodiment of the present invention in use.

Please refer to FIGS. 5 to 7, which show an operating lever assembly according to a second preferred embodiment of the present invention in use. As shown, in the second preferred embodiment, the fastening member 1 includes a connecting section 14, and the lever member 2 includes two first mating locating sections 21 and a movement space 24 located corresponding to the connecting section 14. The connecting section 14 is movable within the movement space 24, so that the fastening member 1 and the lever member 2 are movably connected to each other. The connecting section 14 can be a pin or a fastening element. In another operable embodiment, the connecting section can be provided on the lever member 2 or between the fastening member 1 and the lever member 2. In the case the connecting section is provided on the lever member 2, the movement space can be provided on the fastening member 1. In the second preferred embodiment, the fastening member 1 also includes a receiving space 12, within which the lever member 2 and the fastening member 1 are allowed to move relative to each other. When the retaining section 11 of the fastening member 1 is fastened to or released from the mating retaining section 31 of the first object 3, the lever member 2 is brought to move in the receiving space 12 of the fastening member 1 in a linear motion. At this point, the first locating section 13 is elastically moved from one of the first mating locating sections 21 into the other one. Further, the lever member 2 is provided with a push section 25 for pressing against a corresponding push member 6. In the illustrated second preferred embodiment, the lever member 2 includes two push sections 25 for pressing against the corresponding push member 6. However, it is understood more than two push sections 25 can be provided according to actual need in use. After the retaining section 11 is released from the first object 3, the second object 4 connected to the lever member 2 via the assembling section 22 can be more easily pushed, stopped, opened, closed or turned through leverage using the one or more push sections 25.

Figure 8:
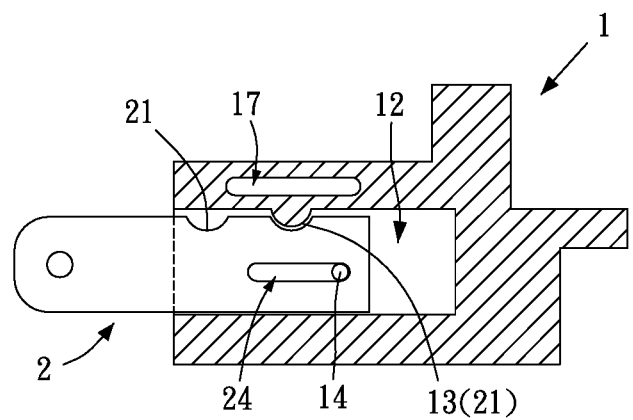
FIG. 8 shows the working manner of an operating lever assembly according to a third preferred embodiment of the present invention.
Figure 9:
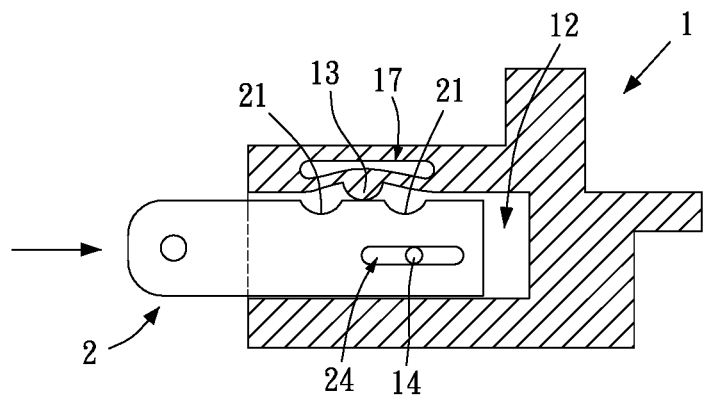
FIG. 9 shows the working manner of an operating lever assembly according to a third preferred embodiment of the present invention.
Figure 10:
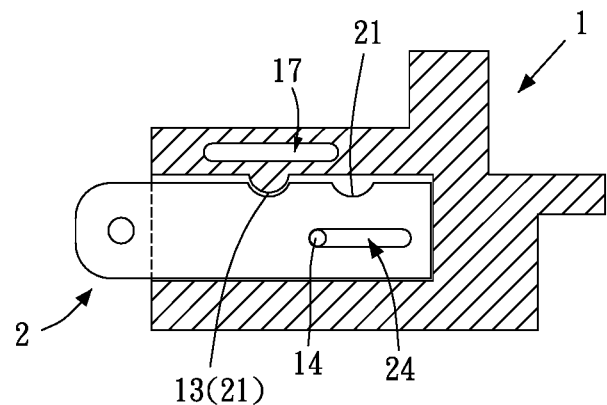
FIG. 10 shows the working manner of an operating lever assembly according to a third preferred embodiment of the present invention.

Please refer to FIGS. 8 to 10, which show the working manner of an operating lever assembly according to a third preferred embodiment of the present invention. As shown, in the third preferred embodiment, the fastening member 1 is provided with a flexible space 17 located corresponding to the first locating section 13. When the lever member 2 is linearly moved in the receiving space 12 of the fastening member 1, the connecting section 14 is also moved within the movement space 24 and the first locating section 13 is elastically moved from one of the two first mating locating sections 21 into the other one. In the process the first locating section 13 is moving from one to the other first mating locating section 21, the flexible space 17 is elastically deformable or reducible to enable easier movement of the first locating section 13 relative to and between the two first mating locating sections 21. The flexible space 17 automatically returns to its original shape without deformation or reduction after the first locating section 13 has moved into the other first mating locating section 21. The flexible space 17 can be a through hole, a through slot, a holed section, a slotted section, a recess, a stepped section, a cut, a groove, a sunken hole, a cavity, a protrusion, a flat section, a cambered section, a curved section or a corrugated section.

Figure 11:
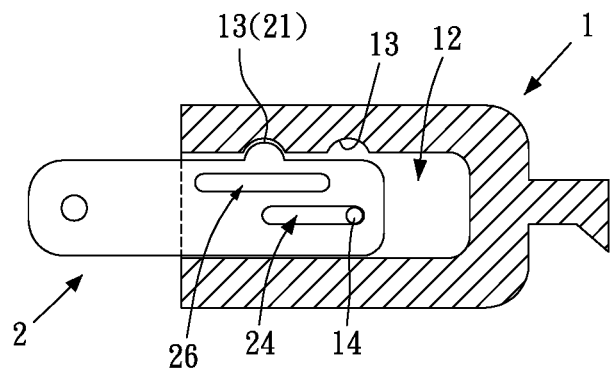
FIG. 11 shows the working manner of an operating lever assembly according to a fourth preferred embodiment of the present invention.
Figure 12:
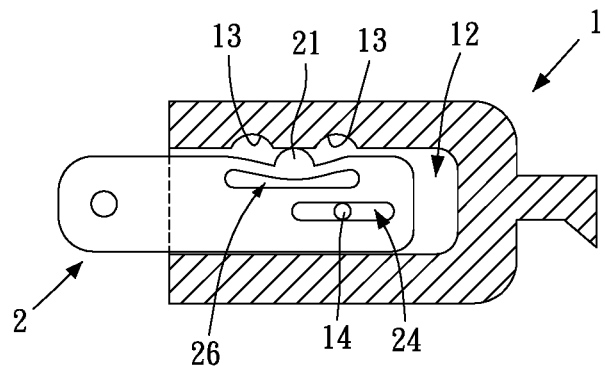
FIG. 12 shows the working manner of an operating lever assembly according to a fourth preferred embodiment of the present invention.
Figure 13:
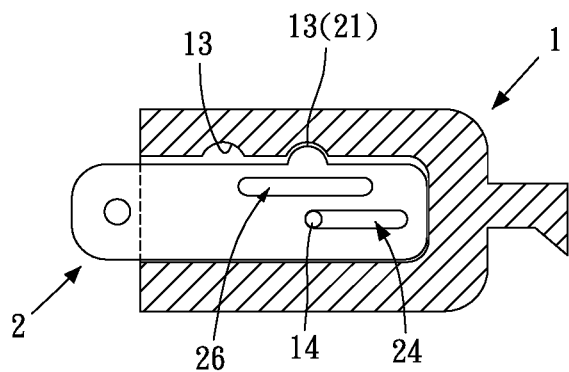
FIG. 13 shows the working manner of an operating lever assembly according to a fourth preferred embodiment of the present invention.

Please refer to FIGS. 11 to 13, which show the working manner of an operating lever assembly according to a fourth preferred embodiment of the present invention. As shown, in the fourth preferred embodiment, the lever member 2 is provided with a flexible space 26 and includes one first mating locating section 21, and the fastening member 1 includes two first locating sections 13. When the lever member 2 is linearly moved in the receiving space 12 of the fastening member 1, the connecting section 14 is also moved within the movement space 24 and the first mating locating section 21 is elastically moved from one of the two first locating sections 13 into the other one. In the process the first mating locating section 21 is moving from one to the other first locating section 13, the flexible space 26 is elastically deformable or reducible to enable easier movement of the first mating locating section 21 relative to and between the two first locating sections 13. The flexible space 26 automatically returns to its original shape without deformation or reduction after the first mating locating section 21 has moved into the other first locating section 13. In the fourth preferred embodiment, the first locating sections 13 are recesses and the first mating locating section 21 is a protrusion. With these arrangements, the present invention is more practical for use.

Figure 14:
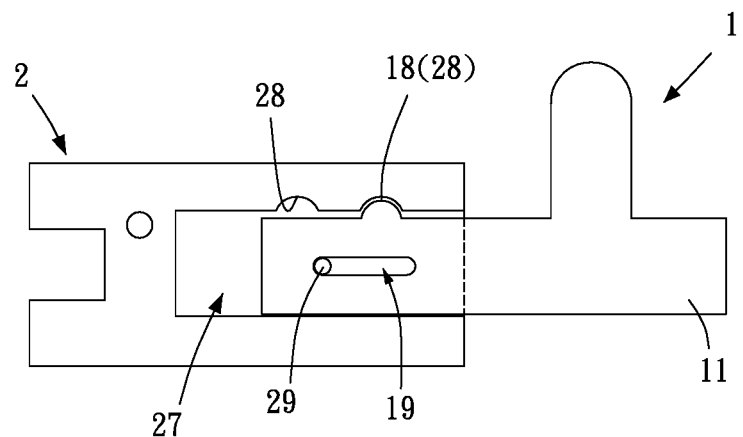
FIG. 14 shows the working manner of an operating lever assembly according to a fifth preferred embodiment of the present invention.
Figure 15:
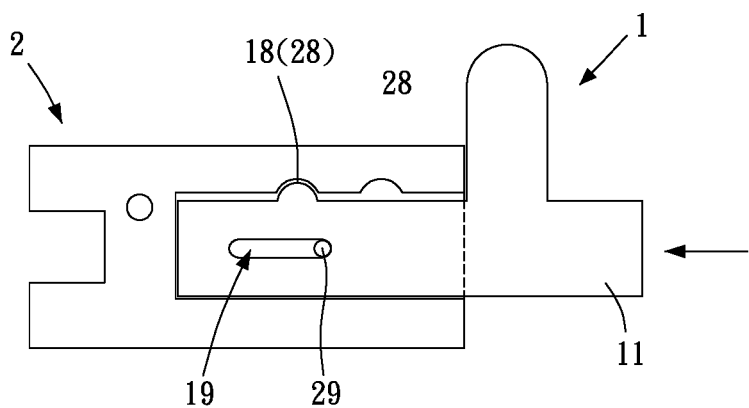
FIG. 15 shows the working manner of an operating lever assembly according to a fifth preferred embodiment of the present invention.

Please refer to FIGS. 14 and 15, which show the working manner of an operating lever assembly according to a fifth preferred embodiment of the present invention. As shown, in the fifth preferred embodiment, the fastening member 1 includes a retaining section 11 and a locating section 18, and the lever member 2 includes a receiving space 27 and at least one mating locating section 28. In the illustrated fifth preferred embodiment, the lever member 2 includes two mating locating sections 28. The fastening member 1 is movably connected to the receiving space 27 of the lever member 2, and the locating section 18 of the fastening member 1 can be releasably engaged with any one of the two mating locating sections 28 of the lever member 2 to locate the fastening member 1 in place on the lever member 2. The lever member 2 further includes a connecting section 29, and the fastening member 1 includes a movement space 19 corresponding to the connecting section 29. The fastening member 1 and the lever member 2 are movably connected to each other with the connecting section 29 movably received in the movement space 19. Therefore, the fastening member 1 can be linearly moved in the receiving space 27 of the lever member 2 while the connecting section 29 moves within the movement space 19, and the locating section 18 is elastically movable from one of the two mating locating sections 28 into the other one to locate the fastening member 1 in place on the lever member 2 when the retaining section 11 of the fastening member 1 is fastened to or released from an object (not shown in FIGS. 14 and 15).

Figure 16:
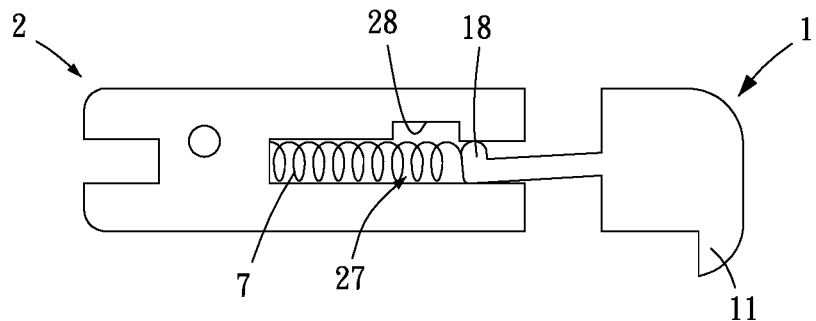
FIG. 16 is a schematic view of an operating lever assembly according to a sixth preferred embodiment of the present invention.
Figure 17:
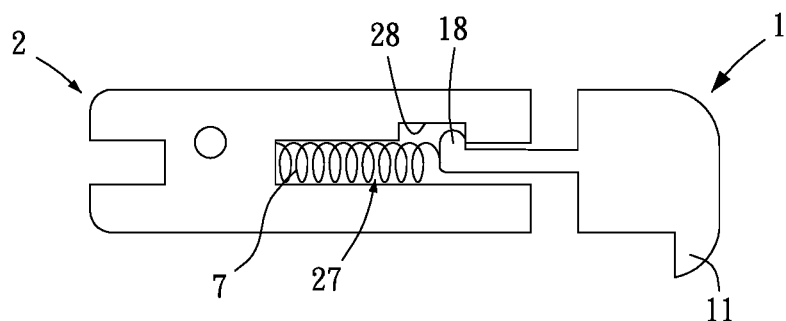
FIG. 17 is a schematic view of an operating lever assembly according to a sixth preferred embodiment of the present invention.
Figure 18:
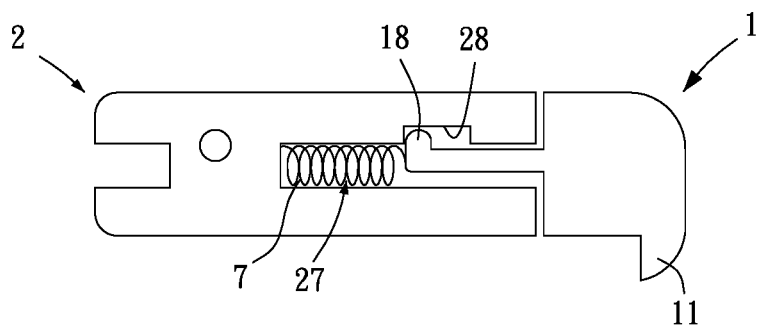
FIG. 18 is a schematic view of an operating lever assembly according to a sixth preferred embodiment of the present invention.

Please refer to FIGS. 16 to 18, which are schematic views of an operating lever assembly according to a sixth preferred embodiment of the present invention. As shown, in the sixth preferred embodiment, the fastening member 1 includes a retaining section 11 and a locating section 18, and the lever member 2 includes a receiving space 27 and at least one mating locating section 28. In the sixth preferred embodiment, the operating lever assembly further includes an elastic element 7 disposed in the receiving space 27 to locate between the locating section 18 and the lever member 2. The fastening member 1 is movably connected to the receiving space 27 of the lever member 2, and the locating section 18 of the fastening member 1 is movably engaged with the mating locating section 28 of the lever member 2 to hold the fastening member 1 to the lever member 2. With these arrangements, the fastening member 1 can linearly move in the receiving space 27 of the lever member 2 to compress or release the elastic element 7, so that the retaining section 11 of the fastening member 1 can be elastically fastened to or released from an object.

Figure 19:
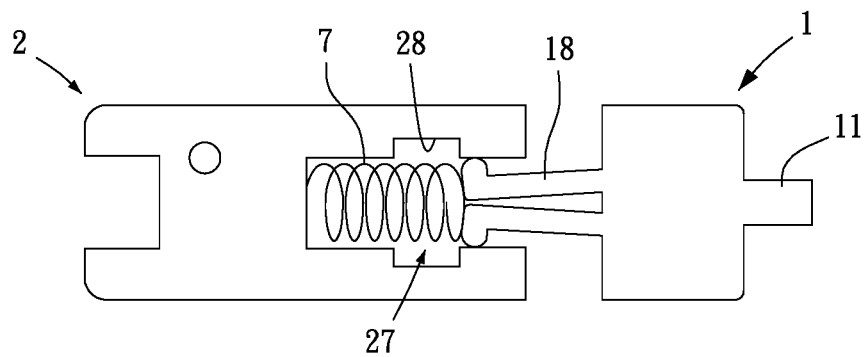
FIG. 19 is a schematic view of an operating lever assembly according to a seventh preferred embodiment of the present invention.
Figure 20:
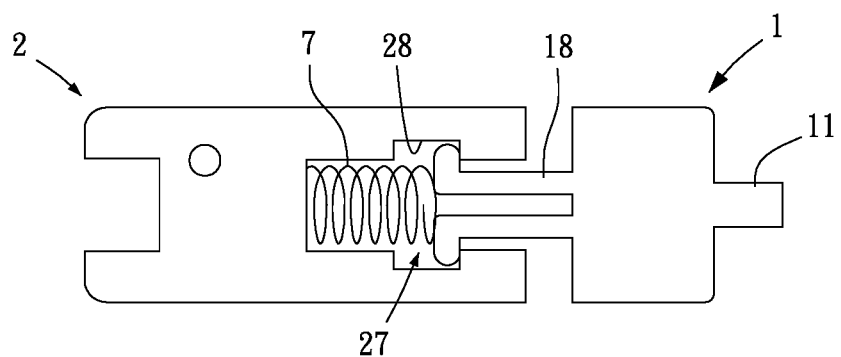
FIG. 20 is a schematic view of an operating lever assembly according to a seventh preferred embodiment of the present invention.
Figure 21:
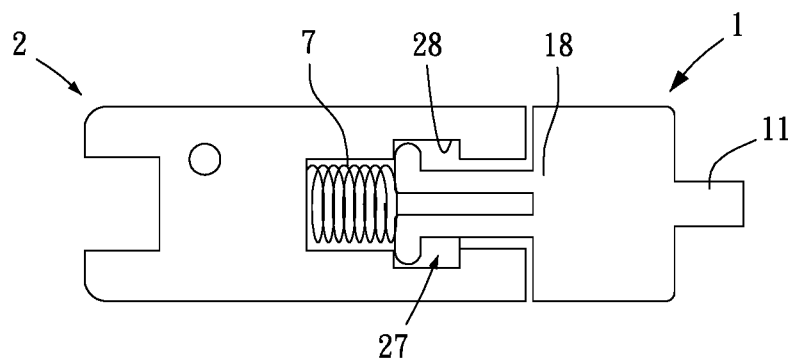
FIG. 21 is a schematic view of an operating lever assembly according to a seventh preferred embodiment of the present invention.

Please refer to FIGS. 19 to 21, which are schematic views of an operating lever assembly according to a seventh preferred embodiment of the present invention. As shown, in the seventh preferred embodiment, the locating section 18 of the fastening member 1 is in the form of an elastic retaining element, which can be elastically extended into the receiving space 27 of the lever member 2 to engage with the mating locating section 28 of the lever member 2 and thereby hold the fastening member 1 to the lever member 2. In the seventh preferred embodiment, the operating lever assembly further includes an elastic element 7 disposed in the receiving space 27 to locate between the locating section 18 and the lever member 2. With these arrangements, the fastening member 1 can linearly move in the receiving space 27 of the lever member 2 to compress or release the elastic element 7, so that the retaining section 11 of the fastening member 1 can be elastically fastened to or released from an object.

Figure 22:
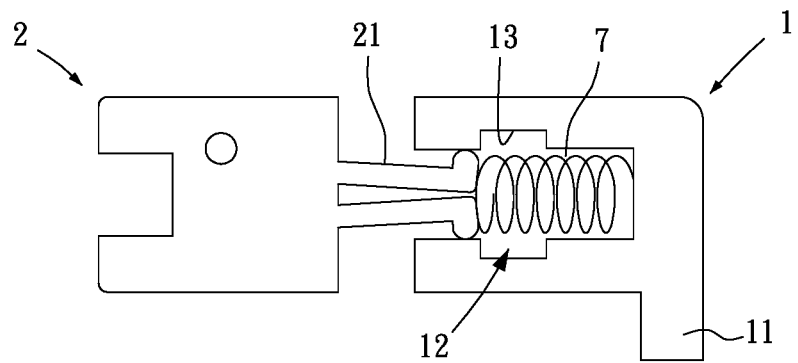
FIG. 22 is a schematic view of an operating lever assembly according to an eighth preferred embodiment of the present invention.
Figure 23:
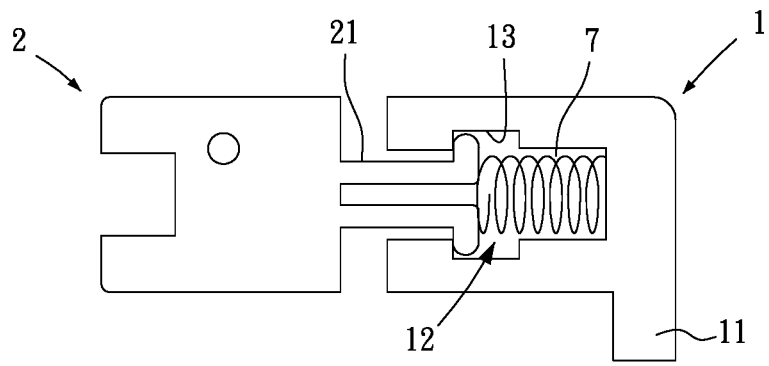
FIG. 23 is a schematic view of an operating lever assembly according to an eighth preferred embodiment of the present invention.
Figure 24:
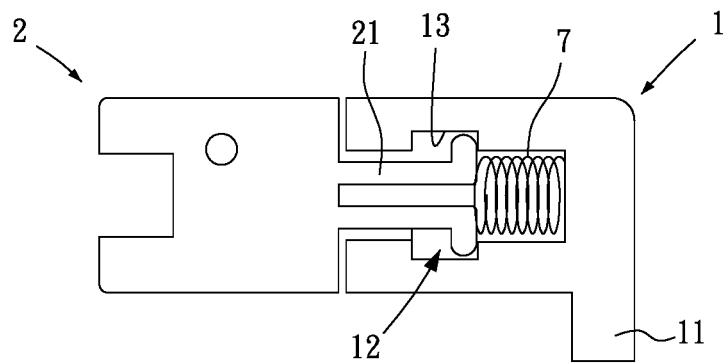
FIG. 24 is a schematic view of an operating lever assembly according to an eighth preferred embodiment of the present invention.

Please refer to FIGS. 22 to 24, which are schematic views of an operating lever assembly according to an eighth preferred embodiment of the present invention. As shown, in the eighth preferred embodiment, the mating locating section 21 of the lever member 2 is in the form of an elastic retaining element, which can be elastically extended into the receiving space 12 of the fastening member 1 to engage with the locating section 13 of the fastening member 1 and thereby hold the fastening member 1 to the lever member 2. In the eighth preferred embodiment, the operating lever assembly further includes an elastic element 7 disposed in the receiving space 12 to locate between the mating locating section 21 and the fastening member 1. With these arrangements, the lever member 2 can linearly move in the receiving space 12 of the fastening member 1 to compress or release the elastic element 7, so that the retaining section 11 of the fastening member 1 can be elastically fastened to or released from an object.

Figure 25:
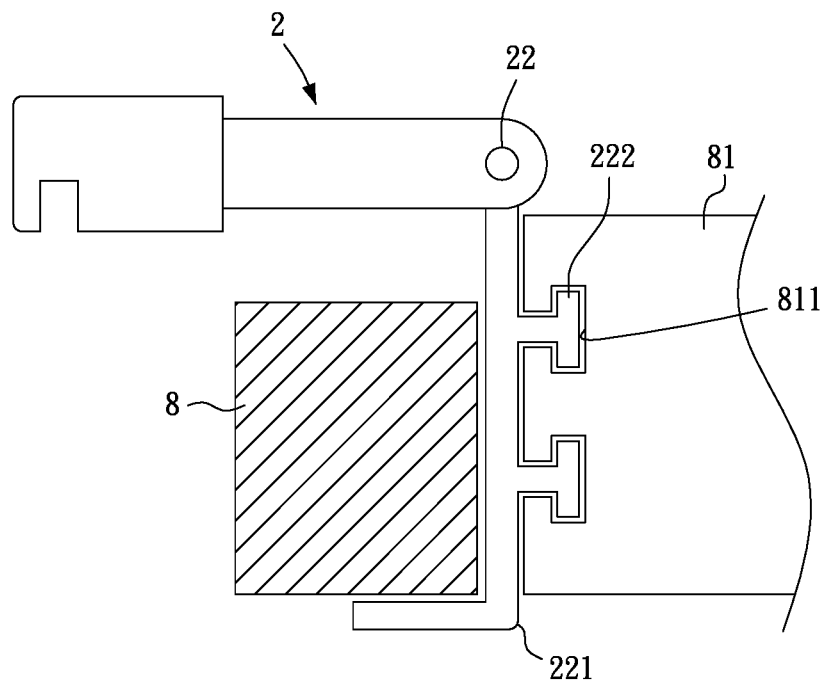
FIG. 25 is a schematic view of an operating lever assembly according to a ninth preferred embodiment of the present invention.

Please refer to FIG. 25, which is a schematic view of an operating lever assembly according to a ninth preferred embodiment of the present invention. As shown, in the ninth preferred embodiment, the assembling section 22 of the lever member 2 is assembled to a lifting and pulling section 221, which can be used to lift and pull a corresponding object 8 to be lifted. The lifting and pulling section 221 includes at least two coupling sections 222 for coupling with mating coupling sections 811 on an object 81.

Figure 26:
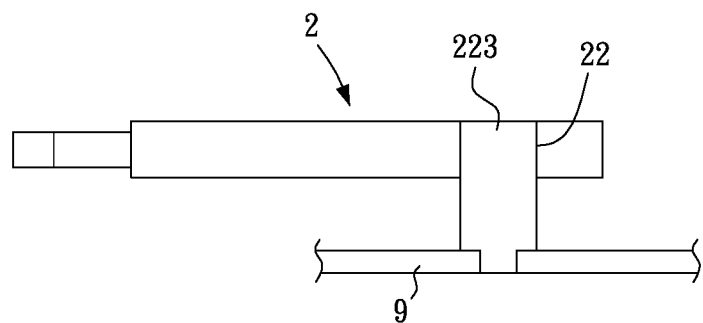
FIG. 26 is a schematic view of an operating lever assembly according to a tenth preferred embodiment of the present invention.

Please refer to FIG. 26, which is a schematic view of an operating lever assembly according to a tenth preferred embodiment of the present invention. As shown, in the tenth preferred embodiment, the assembling section 22 of the lever member 2 is rotatably connected to an interconnecting element 223, which is in turn connected to a corresponding object 9.

The present invention has been described with some preferred embodiments thereof and it is understood that the preferred embodiments are only illustrative and not intended to limit the present invention in any way and many changes and modifications in the described embodiments can be carried out without departing from the scope and the spirit of the invention that is intended to be limited only by the appended claims.

What is claimed is:

1. An operating lever assembly, comprising:
   a fastening member including a retaining section, a receiving space and at least one locating section, and a lever member including at least one mating locating section; and the lever member being movably connected to the receiving space of the fastening member; or
   a fastening member including a retaining section and at least one locating section, and a lever member including a receiving space and at least one mating locating section; and the fastening member being movably connected to the receiving space of the lever member;
   wherein the fastening member or the lever member includes a flexible space, which is elastically deformable or reducible when the locating section is moving between two mating locating sections or the mating locating section is moving between two locating sections.

2. The operating lever assembly as claimed in claim 1, wherein the fastening member or the lever member includes a connecting section for connecting the fastening member and the lever member to each other.

3. The operating lever assembly as claimed in claim 1, further comprising a connecting section provided on one of or between the fastening member and the lever member; and the fastening member and the lever member being movably connected to each other via the connecting section.

4. The operating lever assembly as claimed in claim 3, further comprising a movement space provided on one of the fastening member and the lever member and located corresponding to the connecting section; and the connecting section being movable within the movement space.

5. The operating lever assembly as claimed in claim 1, wherein the retaining section of the fastening member is releasably fastened to a mating retaining section of an object.

6. The operating lever assembly as claimed in claim 1, wherein the receiving space allows the lever member or the fastening member to move therein when any one of them are moving relative to the other one.

7. The operating lever assembly as claimed in claim 1, wherein the locating section is an elastic retaining element and can be caused to elastically move out of, move into or interfere with the mating locating section of the lever member when the fastening member is operated, turned or moved.

8. The operating lever assembly as claimed in claim 1, wherein the locating section can be an interfering element or a retaining element, which can be caused to move out of or move into or interfere with the mating locating section of the lever member when the fastening member is operated, turned or moved.

9. The operating lever assembly as claimed in claim 1, wherein the lever member includes an assembling section for assembling to another object.

10. The operating lever assembly as claimed in claim 1, wherein the lever member includes one push section or two push sections for pushing a corresponding push member, so that an object assembled to the lever member can be more easily pushed, stopped, opened, closed or turned through leverage using the one push section or the two push sections.

11. The operating lever assembly as claimed in claim 1, wherein the fastening member or the lever member is formed by in-mold injection molding using a mold and a heated molten raw material, which is poured into the mold and is then cooled and molded to form a solid fastening member.

12. The operating lever assembly as claimed in claim 1, wherein the fastening member or the lever member includes one or more locating sections or mating locating sections, respectively, to provide the function of holding the fastening member in place on the lever member when the fastening member is released from an object fastened thereto or is re-fastened to an object to be fastened thereto, or releasing the fastening member from the lever member after the fastening member has been held in place on the lever member when the fastening member is released from an object fastened thereto.

13. The operating lever assembly as claimed in claim 1, wherein the fastening member or the lever member is movable within the receiving space in a rotational motion or in a linear motion.

14. The operating lever assembly as claimed in claim 1, wherein the mating locating section is an elastic retaining element and can be caused to elastically move out of, move into or interfere with the locating section of the fastening member when the fastening member is operated, turned or moved.

15. An operating lever assembly, comprising:
a fastening member including a retaining section, a receiving space and at least one locating section, and a lever member including at least one mating locating section; and the lever member being movably connected to the receiving space of the fastening member; or
a fastening member including a retaining section and at least one locating section, and a lever member including a receiving space and at least one mating locating section; and the fastening member being movably connected to the receiving space of the lever member;
wherein the locating section of the fastening member is in the form of an elastic retaining element and can therefore be elastically extended into and held to the receiving space of the lever member.

16. An operating lever assembly, comprising:
a fastening member including a retaining section, a receiving space and at least one locating section, and a lever member including at least one mating locating section; and the lever member being movably connected to the receiving space of the fastening member; or
a fastening member including a retaining section and at least one locating section, and a lever member including a receiving space and at least one mating locating section; and the fastening member being movably connected to the receiving space of the lever member;
wherein the mating locating section of the lever member is in the form of an elastic retaining element and can therefore be elastically extended into and held to the receiving space of the fastening member.

17. An operating lever assembly, comprising:
a fastening member including a retaining section, a receiving space and at least one locating section, and a lever member including at least one mating locating section; and the lever member being movably connected to the receiving space of the fastening member; or
a fastening member including a retaining section and at least one locating section, and a lever member including a receiving space and at least one mating locating section; and the fastening member being movably connected to the receiving space of the lever member;
wherein the lever member includes an assembling section for assembling to another object;
wherein the assembling section is assembled to a lifting and pulling section for lifting and pulling a corresponding object to be lifted; and the lifting and pulling section including coupling sections for coupling with mating coupling sections of an object.

18. An operating lever assembly, comprising:
a fastening member including a retaining section, a receiving space and at least one locating section, and a lever member including at least one mating locating section; and the lever member being movably connected to the receiving space of the fastening member; or
a fastening member including a retaining section and at least one locating section, and a lever member including a receiving space and at least one mating locating section; and the fastening member being movably connected to the receiving space of the lever member;
wherein the lever member includes an assembling section for assembling to another object;

wherein the assembling section is rotatably connected to an interconnecting element, which is in turn connected to a corresponding object.

* * * * *